J. ECKHARD.
SHOCK ABSORBER FOR VEHICLES.
APPLICATION FILED SEPT. 24, 1919.
1,426,051.
Patented Aug. 15, 1922.
2 SHEETS—SHEET 1.
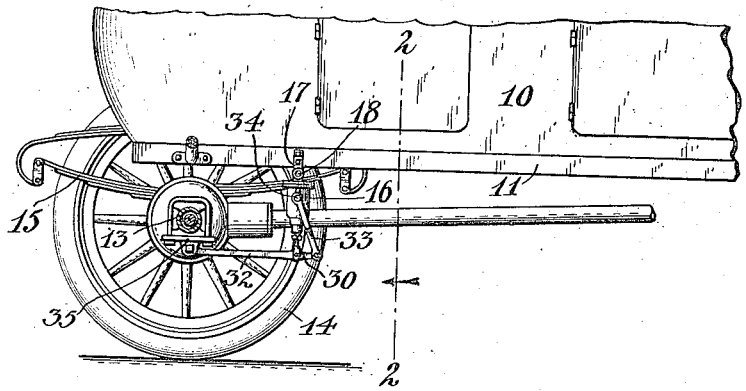
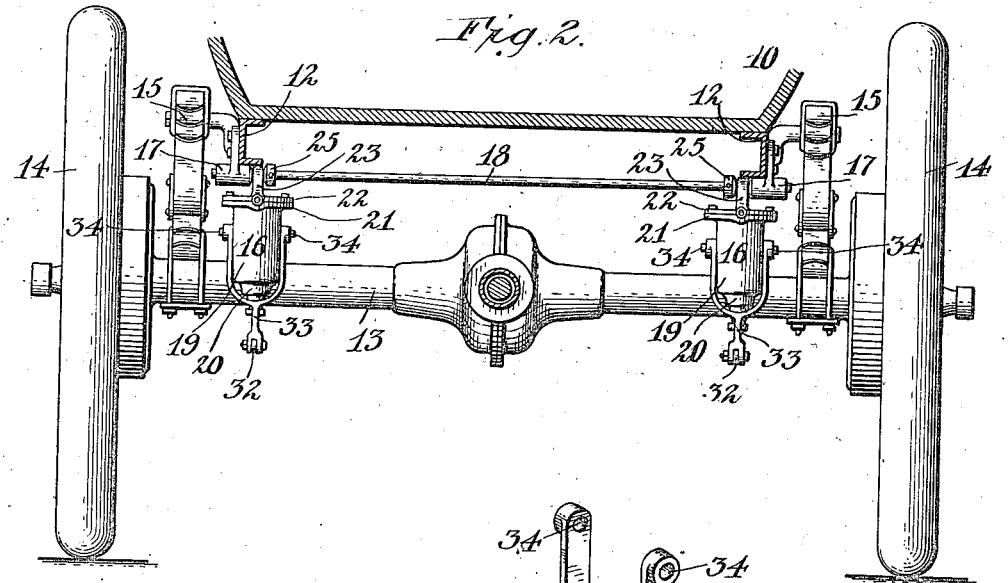
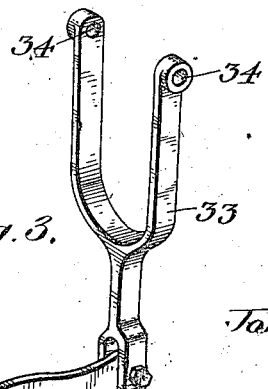
Witness:
Jacob Oberst, Jr.
John Eckhard,
Inventor.
By Emil Neuhard
Attorney.

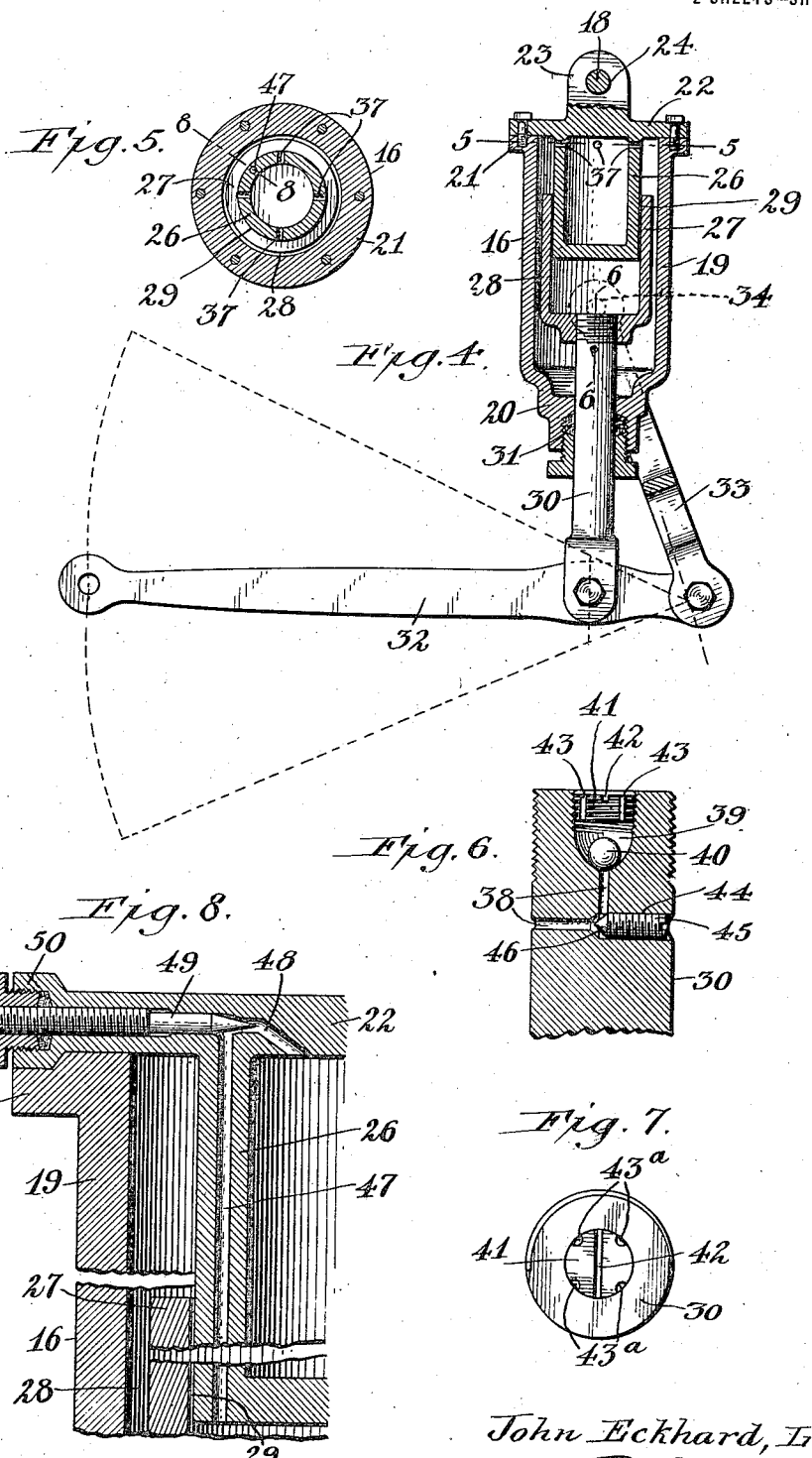

UNITED STATES PATENT OFFICE.

JOHN ECKHARD, OF BUFFALO, NEW YORK.

SHOCK ABSORBER FOR VEHICLES.

1,426,051.   Specification of Letters Patent.   Patented Aug. 15, 1922.

Application filed September 24, 1919. Serial No. 326,014.

*To all whom it may concern:*

Be it known that I, JOHN ECKHARD, a citizen of the United States, residing at Buffalo, in the county of Erie and State of New York, have invented certain new and useful Improvements in Shock Absorbers for Vehicles, of which the following is a specification.

My invention relates to an improved shock absorber, and it has for one of its objects the provision of a simple and effective shock absorber which includes a liquid filled chamber and seepage passages through which the liquid is caused to pass when displaced from one portion of the chamber and forced into another under pressure exerted by the vibrations or jarring of the vehicle body to which it is attached.

Another object of my invention is to provide a simple and effective shock absorber in which the shock absorbing elements are restricted in their movements and wherein such movements are imparted thereto by lever mechanism receiving a comparatively large initial movement and having connection with said shock absorbing elements in such a manner that the movement of said mechanism is greatly reduced at the point of connection to the shock absorbing elements.

With these and other objects in view, the invention consists in the novel features of construction and in the arrangement and combination of parts to be hereinafter described and more particularly pointed out in the subjoined claims.

In the drawings:—

Fig. 1 is a longitudinal section along the rear portion of an automobile showing one of my improved shock absorbing devices in elevation as applied to the automobile.

Fig. 2 is an enlarged transverse section taken on line 2—2, Fig. 1, looking in the direction of the arrow crossing said line.

Fig. 3 is a detached perspective view of the actuating levers of the lever mechanism connected together.

Fig. 4 is a vertical section through the device disconnected from the automobile.

Fig. 5 is a horizontal section taken on line 5—5, Fig. 4.

Fig. 6 is an enlarged vertical section through the rod of the cylinder or dash-pot, taken on line 6—6, Fig. 4, looking toward the left.

Fig. 7 is an end view of the rod of the cylinder or dash-pot as shown in Fig. 6.

Fig. 8 is an enlarged broken transverse section through the upper portion of the device, taken on line 8—8, Fig. 5.

In the drawings I have shown these improved shock absorbing devices at the rear end of an automobile, but they may be attached to the front end in the same or substantially the same manner as shown at the rear end.

The reference numeral 10 designates the automobile body, 11 the chassis which has its frame constructed of the usual channel-shaped members 12. 13 designates the rear axle housing within which the usual driving axle is arranged and to said driving axle the rear or driving wheels 14 of the automobile are secured.

The body 10 of the automobile is supported by the springs 15, which are secured to the axle housing 13 and to the body of the vehicle or the chassis 11 thereof, in any approved manner.

16 designates my improved shock absorbing devices, two of which are employed at the rear of the automobile, as shown, and if desired, two at the front end thereof.

One form of securing these devices to the automobile or vehicle body or, more particularly, to the frame or chassis, is shown in Fig. 2, in which hangers 17 are secured to the opposite side channel-shaped members of the frame or chassis, and secured in these hangers is a cross rod 18.

Each shock absorbing device comprises a cylindrical liquid filled casing 19 having a reduced lower end portion 20 and having at its upper end an outstanding flange 21 and a cap 22 secured to said flange by means of bolts, or in any other suitable manner, said cap having an upwardly-directed lug 23 provided with an opening 24 through which the transverse rod 18 is passed. In preferred form said lug 23 bears against the inner end of one of the hangers 17, and to prevent lateral movement of said casing 19 a collar 25 is fastened to said transverse rod and bears against the lug 23. The inner end of the hanger 17 and the outer surface of said collar 25 are convex so that slight swaying movement of the casing is permitted to accommodate itself to the twisting strains to which the automobile is necessarily subjected.

The cap 22 of the casing is provided with a depending cylindrical portion 26, which may be termed a piston and which extends axially into the casing 19. Co-axial with said piston within said casing 19 is a cylinder or dash-pot 27 which opens upwardly and receives and reciprocates over the depending portion or piston 26 of the cap 22. The outer diameter of the cylinder or dash-pot 27 is somewhat smaller than the inner diameter of the casing 19 so that an annular passage 28 is provided between the two, and the cylinder or dash-pot fits loosely around the depending portion or piston 26, sufficient space being provided between the two to form an annular seepage space 29.

To the lower closed end of the cylinder or dash-pot 27, a rod 30 is secured which extends outwardly through the lower end of the casing 19, a stuffing box 31 being provided at said lower end to prevent leakage of the liquid within the casing. The rod 30 has its upper end threaded into the cylinder or dash-pot 27 and its lower end is bifurcated to receive a lever 32 which is pivoted thereto. Said lever extends a short distance from said rod in one direction and has connected thereto one end of a forked lever 33, the other end of said forked lever being pivotally secured to the casing 19 at diametrically opposite points, as at 34. The lever 32 extends a considerable distance from the rod 30 in the opposite direction and is pivotally secured to a bracket or other fixture 35 fastened to the axle housing 13.

In the drawings I have shown the casing 19 arranged forward of the rear axle housing, but in some automobiles it will be found more convenient to arrange this casing in rear of the axle housing, particularly where the chassis or the body of the automobile extends a considerable distance in rear of the plane passing vertically through the axle housing.

The depending portion or piston 26 formed on the cap 22 of the casing is provided with a plurality of small openings 37 near its upper end, which may be termed "seepage openings", and the upper or inner end of the rod 30 is provided with an L-shaped seepage passage 38 opening into a pocket 39 formed axially in the upper end of said rod, said pocket having a spherical valve 40 therein adapted to close the upper end of the passage 38. The upper portion of the pocket 39 is screw threaded to receive a threaded plug 41 having a kerf 42 therein so that it may be easily removed from or adjusted within the pocket. Said plug is provided with longitudinal grooves 43 in its periphery, forming seepage passages 43ª between the plug and the wall of said pocket 39.

Alined with the horizontal portion of the L-shaped seepage passage 38, is a threaded opening 44 into which a screw valve 45 is threaded, said valve having its inner end tapered, as at 46, to regulate the size of the passage 38 at the angle thereof, and thus control the displacement of the liquid from one portion of the casing to another, by way of said seepage passage.

The operation of the device is as follows:

The casing 19 being filled with a liquid substance is attached to the vehicle frame or chassis or to the body of a vehicle while the cylinder or dash pot within said casing has its rod connected to a part attached to the axle housing which is movable with respect to the frame or chassis or the vehicle body. The vibrations of the vehicle body cause relative movement of the casing and cylinder or dash pot and with the liquid, preferably oil, filling the casing, a displacement of the liquid necessarily takes place from one portion of the casing to another through the seepage passages between the movable parts within the casing.

As shown in Fig. 4, the positions of the parts are normal, therefore when the wheels of the vehicle pass over an obstruction or enter a depression in a road so as to cause the vehicle springs to close and the body of the vehicle to lower, the casing 19 is moved downwardly, thereby causing the depending portion or piston 26 to enter the cylinder or dash pot 27 to a greater extent. Part of the liquid within the cylinder or dash pot is displaced by the piston and passes upwardly around the piston so as to enter the enlarged space within the casing created by reason of the lower wall of the casing moving away from the lower end of the cylinder or dash pot. The lowering movement of the vehicle body is consequently retarded, due to the fact that the annular seepage passage between the piston and the cylinder or dash pot is exceedingly small. As the vehicle springs recover themselves, the chassis or the vehicle body moves upwardly, causing the piston 26 to move outwardly so as to bring the cylinder or dash-pot to a lower position within the casing 19. This displaces a portion of the liquid in the lower portion of the casing and compels it to re-enter the cylinder or dash-pot,—the space between the lower end of which and the lower end of the piston having become enlarged by such action—the fluid being forced through the L-shaped seepage passage 38 in the rod 30 and also through the seepage space or annular passage between the piston 26 and the cylinder or dash-pot. In this manner, sudden rebound of the vehicle body is prevented and the body is caused to move upwardly and downwardly by easy movements, eliminating all sudden shocks and jars.

In some instances, particularly in new cars and cars having stiff vehicle springs, the piston 26 may be provided with a passage 47, which extends vertically within the cylindrical wall thereof and has connection with a passage 48 in the cap 22, the passage 48 extending from the passage 47 to the interior of the piston and opening into the top thereof, as shown in Fig. 8. A needle valve 49 is arranged within the cap and is adapted to control the passage of the liquid through the passages 47 and 48, the needle valve being accessible from the edge of the cap and passing through a stuffing box 50 arranged in said cap. By opening the needle valve, additional seepage is provided for the fluid so that the parts operate more freely.

When using the passage 47 in the piston, the liquid within the cylinder is in part caused to pass upwardly through said passage and into the piston when the vehicle body lowers, the amount of liquid passing through said passage being controlled by the valve 49. When the vehicle body rises or rebounds, the piston moves upwardly, causing suction to be created within the cylinder or dash-pot, and in addition to the liquid being drawn into the cylinder through the L-shaped passage 38 in the rod 30, it is also drawn out of the piston through the passage 47.

Similar effect is had with reference to the openings 37 near the upper end of the piston, the liquid being forced into the piston through these openings during the lowering movement of the vehicle body, and the suction created within the casing when the body rises or recovers itself causes the liquid to be drawn out of the piston through said openings.

The mechanism within the casing may be termed in a broad sense "liquid-displacing means," while the casing itself may be termed "liquid-enclosing means," and in a somewhat restricted sense the operating parts within the casing may be termed a "dash-pot device," and it is my intention to have these terms when used in the claims construed accordingly.

Having thus described my invention, what I claim is:—

1. A shock absorber comprising a closed casing adapted for connection to one part of a vehicle, a dash-pot device within said casing, a lever connected at diametrically opposite points to the exterior of said casing, and a second lever pivotally connected to said dash-pot device and to said first-mentioned lever and adapted for connection to another part of a vehicle movable with respect to the first-mentioned part of the vehicle.

2. In an automobile, the combination with two relatively movable vehicle parts, of a liquid-enclosing medium connected to one of said vehicle parts, liquid-displacing means within said liquid-enclosing medium, a rod connected to said liquid-displacing means and extending through one of the walls of said fluid-enclosing medium, a lever pivotally connected at one end to said liquid-enclosing medium and arranged at an acute angle to said rod, and a second lever pivotally connected near one end to said rod and having said end pivotally connected to said first-mentioned lever, the other end of said second lever being pivotally connected to the other vehicle part.

3. A shock absorber comprising a liquid-containing casing having a cap closing its upper end and a piston axially therein extending from said cap, a cylinder axially within said casing in which said piston is adapted to move, said piston fitting freely within said cylinder to provide an annular seepage passage between the two, a stuffing-box at the end of said casing opposite said cap, a rod extending through said stuffing-box and having one end thereof connected to said cylinder, and means for causing actuation of said cylinder.

4. A shock absorbing device having a liquid-enclosing casing, a piston extending inwardly from one end wall of said casing, a cylinder loosely surrounding said piston and having its closed end normally spaced from the other end of said casing, a rod secured to the closed end of said cylinder and extending outwardly through said casing, and a seepage passage extending through said rod and opening at one end into the interior of said casing and at the other end into said cylinder.

5. A shock absorbing device having a liquid-enclosing casing provided with a piston extending inwardly from one end wall thereof and spaced from the side walls thereof, said piston having a plurality of seepage openings adjacent said end wall, a dash-pot within said casing having free movement around said piston and being spaced from the walls of said casing, and a rod extending outwardly through the opposite end of said casing and having connection at its inner end to said dash pot.

6. A shock absorbing device of the kind described, comprising a cylindrical liquid-enclosing casing having a piston extending inwardly from one end thereof and movable therewith, said piston being spaced from the cylindrical wall of said casing by an annular intervening space, a cylinder normally receiving the lower end of said piston and arranged with a narrow annular seepage passage between the two, a seepage passage through the wall of said piston opening at one end into said cylinder and at the other end into the interior of said piston, means for restricting said last-mentioned seepage passage, and means connected to said cylinder and extending outwardly through said casing for connection with one of two relatively movable vehicle parts, said casing being connected with the other of said two vehicle parts.

7. A shock absorbing device of the kind described, comprising a liquid-enclosing casing having an integral axial portion extending inwardly from one end thereof, a cylinder within said casing and in which said piston is movable for displacing the liquid within said cylinder, said cylinder being adapted to displace part of the liquid within said casing, a rod connected to said cylinder and extending outwardly through the other end of said casing, a pocket axially within the inner end of said rod, a passage leading from said pocket to the interior of said casing, a valve in said pocket for closing said passage, a valve in said rod for restricting said passage, and a plug in said pocket having seepage passages.

In testimony whereof I affix my signature.

JOHN ECKHARD.